Patented Apr. 28, 1953

2,636,875

UNITED STATES PATENT OFFICE 2,636,875

METHYLOL PHENYL COMPOUND

Robert W. Martin, Lafayette, Calif., assignor to General Electric Company, a corporation of New York No Drawing. Application June 12, 1952, Serial No. 293,203

3 Claims. (Cl. 260—52)

1

This invention is concerned with the compound bis-1,4-(2,6 - dimethylol - 4 - methyl phenoxy) butene-2 (hereinafter referred to as "phenoxy butene derivative") and method for preparing the same.

The composition herein described can be heated preferably in the presence of acidic catalysts, for instance, sulfuric acid, hydrochloric acid, para-toluene sulfonic acid, etc., at temperatures ranging from about 100° to 200° C., to give resinous products in various states of condensation including the completely condensed infusible and insoluble state, which resinous products are useful in molding and laminating applications. For molding purposes various fillers, for example, wood flour, asbestos floats, glass fibers, etc., can be incorporated in the molten phenoxy butene derivative, together with dyes, pigments, etc., and the mixture of ingredients molded under heat and pressure to give useful articles.

In order that those skilled in the art may understand how the compound of the present invention may be prepared, the following examples are given.

Example 1

Para-cresol dialcohol having the formula

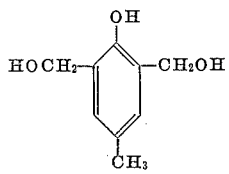

was prepared by dissolving 540 grams of para-cresol in 770 grams of an aqueous sodium hydroxide solution containing 220 grams of NaOH. The solution was cooled and mixed with 830 grams of aqueous formaldehyde (37.5% formaldehyde), and the mixture was held at 30–40° C. for 2 hours and allowed to stand for an additional 15 hours at around room temperature. The sodium salt of 2,6-dimethylol-4-methylphenol was separated and neutralized with dilute acetic acid to give the crystalline dialcohol in a yield of about 791 grams. This composition had a melting point of 129.5–130.5° C. (reported melting point of para-cresol dialcohol is 130° C.). Analysis of this compound showed it to contain 64.25 percent carbon, 7.19 percent hydrogen, and 36.9 percent methylol groups (theoretical 64.50 percent carbon, 7.19 percent hydrogen, and 36.8 percent methylol groups).

2

Example 2

The compound bis - 1,4 - (2,6 - dimethylol-4-methylphenoxy) butene-2 having the formula

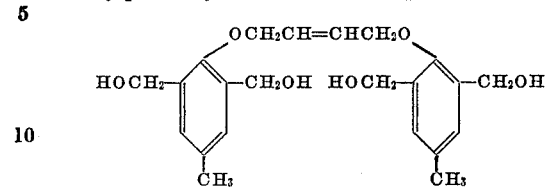

was prepared by refluxing for about 11 hours a mixture of 18 grams of the para-cresol dialcohol prepared in Example 1 with 6.25 grams of 1,4-dichlorobutene-2 and 15 grams of potassium carbonate in 100 ml. acetone. At the end of the reflux period, the solution was cooled and filtered to remove the salt. The acetone was evaporated and the product was recrystallized from toluene to give a crystalline solid having a melting point of about 158–159° C. Analysis of the compound showed it to contain 68.7 percent carbon and 7.49 percent hydrogen (theoretical 68.2 percent carbon and 7.28 percent hydrogen).

To a sample of the phenoxy butene derivative described above was added 0.1 percent, by weight, (in the form of a 1 percent methanol solution) sulfamic acid, based on the weight of the phenoxy butene derivative. The mixture was heated at around 200° C. and tested periodically at this temperature to determine the properties of the condensation product. After 15 minutes the phenoxy butene derivative had become hard and brittle but was still soluble in many solvents. After 1 hour it had become insoluble in boiling toluene and after 2 hours at this temperature, was extremely hard and brittle, and insoluble in boiling toluene.

What I claim as new and desire to secure by Letters Patent of the United States is:

1. The compound bis-1,4-(2,6-dimethylol-4-methylphenoxy) butene-2 having the formula

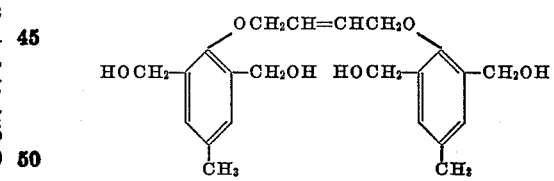

2. The process for making bis-1,4-(2,6-dimethylol - 4 - methylphenoxy) butene-2 which comprises heating a mixture comprising 2,6-dimethylol-4-methylphenol and 1,4-dichlorobutene-2, and thereafter isolating the desired compound.

3. The heat-treated polymer obtained by heating 1,4 - (2,6 - dimethylol - 4 - methylphenoxy) butene-2 in the presence of an acid catalyst.

ROBERT W. MARTIN.

References Cited in the file of this patent

UNITED STATES PATENTS

| Number | Name | Date |
|---|---|---|
| 2,488,497 | Moyle | Nov. 14, 1949 |